United States Patent Office 3,090,783
Patented May 21, 1963

3,090,783
DIHYDROBENZOTHIADIAZINES
Harry L. Yale, New Brunswick, N.J., assignor to Olin Mathieson Chemical Corporation, New York, N.Y., a corporation of Virginia
No Drawing. Filed June 12, 1962, Ser. No. 201,811
14 Claims. (Cl. 260—243)

This invention relates to new chemical compounds and more specifically to new dihydrobenzothiadiazines, their method of manufacture, and new intermediates utilizable in the preparation of the same.

This application is a continuation-in-part of two previous applications, Serial No. 16,161, filed March 21, 1960, and Serial No. 16,162, filed March 21, 1960, both now abandoned.

The final products of this invention may be represented by the general formula:

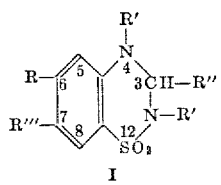

as well as non-toxic acid addition salts thereof, wherein R is hydrogen, lower alkyl, halo, halo(lower alkyl) such as dichloromethyl and trifluoromethyl, lower alkoxy, YN-sulfonyl, wherein YN is as hereinafter defined, alkyl sulfonyl, aralkyl sulfonyl, or cyano; one R' is hydrogen and the other is a YN-(lower alkyl) radical, wherein YN is amino, mono(lower alkyl)amino, di(lower alkyl)amino, monocyclic ar(lower alkyl)amino, or a monocyclic saturated N-heterocyclic radical, such as piperidino, pyrrolidino, piperazino, 4-(lower alkyl)piperazino, 4-(hydroxy-lower alkyl)-piperazino, or 4-(hydroxy-lower alkoxy-lower alkyl)piperazino; R'' is hydrogen, lower alkyl, lower halo alkyl, diaryl(alkenyl), monocyclic ar(lower alkyl), monocyclic ar(lower alkenyl), monocyclic aroyl (lower alkyl) diarylalkyl, monocyclic arylmercapto(lower alkyl, monocyclic ar(lower alkyl)mercapto-(lower alkyl, monocyclic aryloxy(lower alkyl), or monocyclic ar(lower alkoxy)lower alkyl; and R''' is hydrogen or sulfamyl.

The compounds of Formula I are physiologically active substances which possess central nervous system depressant activity and hence may be used in lieu of known central nervous system depressants, such as triflupromazine to produce ataraxis, for which purpose they are administered orally or parenterally in the same manner as triflupromazine, with dosage adjusted for the respective activity of the particular compound. Moreover, those final products of this invention which possess a 7-sulfamyl substituent (R''' is sulfamyl) also possess diuretic as well as anti-hypertensive activity and thus can be administered parenterally and (preferably) orally in the treatment of congestive heart failure, being uniquely suitable for this and other conditions where both the diuretic (i.e., natu-retic) and hypotensive activities are desirable.

The compounds of Formula I can be prepared in a number of ways. Thus, those compounds which contain the aminoalkyl substituent in the 2-position can be prepared by a series of steps, involving first the reaction of a 4,4'-di-R-2,2'-dinitrodiphenylsulfide of the formula

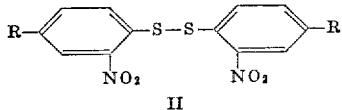

wherein R is as hereinbefore defined, with chlorine whereby the corresponding o-nitro-p-R-benzenesulfonyl chloride derivative of the formula

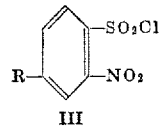

is formed. Among the compounds which can thus be prepared there can be named inter alia: 4-lower alkyl-2-nitro-benzenesulfonyl chloride, such as 4-methyl-2-nitro-benzenesulfonyl chloride and 4-ethyl-2-nitro-benzenesulfonyl chloride; 4-halo-2-nitro-benzenesulfonyl chlorides, such as 4-chloro and 4-fluoro-2-nitro-benzenesulfonyl chloride; 4-halo(lower alkyl) - 2 - nitrobenzenesulfonyl chlorides, such as 4-trifluoromethylbenzenesulfonyl chloride; 4-lower alkoxy - 2 - nitro-benzenesulfonylchlorides, such as 4-methoxy-2-nitro-benzenesulfonyl chloride; 4-cy-ano-2-nitro-benzenesulfonyl chloride; 4-(YN-sulfonyl)-2-nitro-benzenesulfonyl chlorides, wherein YN is as hereinbefore defined, such as 4-(N,N-diethylsulfamyl)-2-nitro-benzenesulfonyl chloride and 4-(N,N-dimethylsulfamyl)-2-nitro-benzenesulfonyl chloride; and 4-[alkyl(or aralkyl)-sulfonyl]-2-nitrobenzenesulfonyl chlorides, such as 4-mesyl-2-nitro-benzenesulfonyl chloride and 4-benzyl-sulfonyl-2-nitro-benzenesulfonyl chloride.

The benzenesulfonyl chlorides of Formula III are next converted to new intermediates of this invention, the corresponding sulfonamides of the general formula

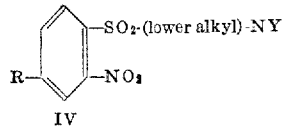

wherein R and YN are as hereinbefore defined, by treatment with a YN-(lower alkyl)-amine, such as an alkyl-enediamine, e.g., ethylenediamine and propylenediamine; and N-mono or N,N-di-lower alkyl-alkylenediamine, e.g., N,N-dimethylethylenediamine, N,N - diethyl-propylenediamine, N-methylethylenediamine and N-ethyl-propylene-diamine; an N-(monocyclic saturated N-heterocyclic)alkylenediamine, e.g., 2-piperidinoethylamine, 3-piperidino-propylamine; 2-pyrrolidinoethylamine; 4-pyrrolidinobu-tylamine, piperizinomethylamine, 2-piperazinoethylamine; 3-piperazinopropylamine; 2 - (4 - methylpiperazino)ethylamine; 3 - (4 - ethylpiperazino)propylamine, 2-[4-(β-hy-droxyethyl)-piperazino]ethylamine; and 2-[4-(β-hydroxy-methoxyethyl)piperazino]-ethylamine; and an N-(mono-cyclic-ar(lower alkyl)]alkylenediamine, e.g., N-benzyl-ethylenediamine and N-phenethylpropylenediamine.

The 2-nitro-4-R-N-[YN-(lower alkyl)]-benzenesulfon-amides of Formula IV are then reduced to the corresponding 2-amino-4-R-N-[YN-(lower alkyl)]-benzenesul-fonamides wherein R and YN are as hereinbefore defined; and then treated with an aldehyde of the formula R''CHO to yield the 2-YN(lower alkyl)-3-R''-6-R-3,4-dihydroben-zothiadiazine-1,1-dioxides of this invention represented by the formula

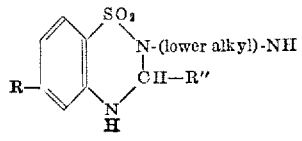

wherein R, R'' and YN are as hereinbefore defined.

Among the suitable aldehyde reactants may be mentioned: alkanals and haloalkanals, particularly the lower alkanals and lower haloalkanals, such as formaldehyde, acetaldehyde, dichloroacetaldehyde, propionaldehyde, 2, 2-dichloropropionaldehyde and butyraldehyde; aralkanals, particularly mononuclear ar(lower alkanals), such as phenylacetaldehyde, α-phenylpropionaldehyde, β-phenylpropionaldehyde, β-phenyl-n-butyraldehyde, o,m, and p-tolylacetaldehyde, 6-phenylcaproaldehyde, and the o,m and p-halo (e.g. chloro), nitro, amino and lower alkoxy (e.g., methoxy) derivatives thereof; aralkenals, particularly mononuclear ar(lower alkenals), such as cinnamaldehyde, β-phenylcrotonaldehyde, 2-phenyl-2-hexenal, and 2-phenyl-4-hexenal; aroyl alkanals, particularly mononuclear aroyl(lower alkanals), such as phenylglyoxal, β-benzoylpropionaldehyde and γ-benzoylvaleraldehyde; diarylalkanals, particularly mononuclear diaryl-lower alkanals, such as diphenylacetaldehyde, β,β-diphenylpropionaldehyde, and α,β-diphenylpropionaldehyde, diarylalkenals, particularly mononuclear diaryl-lower alkenals, such as β,β-diphenylcrotonaldehyde; aryloxyalkanals, particularly mononuclear aryloxy (lower alkanals), such as phenoxyacetaldehyde, β-phenoxypropionaldehyde and γ o,m or p-tolyloxy-n-butyraldehyde; aralkoxyalkanals, particularly mononuclear aryl(lower alkoxy) (lower alkanals), such as benzyloxyacetaldehyde and β-phenethoxy- p r o p i o naldehyde; arylmercaptoalkanals, particularly mononuclear arylmercapto (lower alkanals), such as phenylmercaptoacetaldehyde and β-phenylmercapto propionaldehyde; and aralkylmercaptoalkanals, particularly mononuclear aryl(lower alkyl)mercapto(lower alkanals), such as benzylmercaptoacetaldehyde, β-benzylmercaptopropionaldehyde and γ-benzylmercapto-n-butyraldehyde.

The compounds of Formula V can be readily converted to their 7-sulfamyl analogs by chlorosulfonation (as with chlorosulfonic acid and sodium chloride in an inert solvent) and then treatment of the resulting 7-chlorosulfonyl intermediate with ammonia.

Alternatively, the 2-nitro-4-R'-N-[YN-(lower alkyl)] benzene-sulfonamides of Formula IV may be reduced to the corresponding 2-amino-4-R'-n-[YN-(lower alkyl)] benzenesulfonamides wherein R' and YN are as hereinbefore defined; and then treated with formic acid; an ortho ester, i.e., R"C(O-lower alkyl)₃; or an acid chloride, i.e., R"COCl, to yield the 2(YN-lower alkyl-3-R"-6-R'-1,2,4-benzothiadiazine of this invention represented by the formula

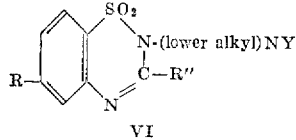

VI wherein R, R" and YN are as hereinbefore defined. Among the suitable reagents may be mentioned: formic acid, lower alkanoic acid chlorides and lower alkyl orthoalkanoates, such as acetyl chloride, propionyl chloride, butyryl chloride, ethyl orthoacetate and ethylorthopropionate; aralkanoyl chlorides and lower alkyl ortho aralkanoic acid esters particularly mononuclear aralkanoyl chlorides and lower alkyl ortho ar(lower alkanoic) esters such as phenylacetyl chloride, ethyl orthophenylacetate, α-phenylpropionyl chloride, ethylortho-propionate, ethyl ortho-β-phenylpropionate, β-phenyl-n-butyryl chloride, o,m and p-tolylacetyl chloride, 6-phenylcaproyl chloride and the o,m and p-halo (e.g., chloro), nitro-, amino-, and lower alkoxy (e.g. methoxy) derivatives thereof; orthoaralkenoic esters and aralkenoyl chlorides, particularly mononuclear ar(lower alkenoyl)chlorides and alkyl ortho ar(lower alkenoic) esters such as cinamyl chloride, β-phenyl-crotonyl chloride, ethyl ortho 2-phenyl-2-hexenoate and ethyl ortho 2-phenyl-4-hexenoate alkyl; ortho aroylalkanoates and aroylalkanoyl chlorides particularly lower alkyl ortho mononuclear aroyl(lower alkanoic)esters and aroyl(lower alkanoyl)chlorides such as ethyl ortho phenyloxalate, β-benzoylpropionyl chloride and γ-benzoylvaleroyl chloride; diaryl alkenoylchlorides and ortho esters, particularly mononuclear diaryl(lower alkanoyl) chlorides and ortho esters such as diphenylacetyl chloride, β,β-diphenylpropionyl chloride and ethyl ortho α,β-diphenylpropionic ester; diaryl alkenoic ortho esters and acid chlorides, particularly mononuclear ethyl ortho diaryl(lower alkenoic) esters and diaryl (lower alkanoyl) chlorides such as ethyl ortho β,β-diphenyl-crotonic ester; ortho aryloxy-alkyl esters and aryloxyalkanoyl chlorides, particularly mononuclear aryloxy (lower alkanoyl) chlorides and ortho esters such as phenoxyacetyl chloride, ethyl ortho β-phenoxypropionyl ester and ethyl ortho γ-(o,m or p-tolyoxy)-n-butyric ester; aralkoxyalkanoyl chlorides and alkyl ortho aralkoxyalkanoates, particularly mononuclear ethyl ortho aryl(lower alkoxy)-(lower alkanoates) and aryl(lower alkoxy)-lower alkanoyl chlorides such as ethyl ortho phenethoxy acetate and ethyl ortho benzyloxyacetate; arylmercaptoalkanoyl chlorides and ortho arylmercaptoalkanoic esters, particularly mononuclear arylmercapto-(lower alkanoyl) chlorides and ethyl ortho arylmercapto(lower alkanoic) esters such as ethyl ortho phenylmercaptoacetate and β-phenylmercaptopropionyl chloride; and aralkylmercaptoalkanoyl chlorides and alkyl ortho-aralkylmercapto alkanoic esters, particularly mononuclear ar(lower alkyl)mercapto lower alkanoyl chlorides and ethyl ortho-aryl(lower alkyl)mercapto-lower alkanoates such as ethyl ortho benzylmercaptoacetate, β-phenethylmercaptopropionyl chloride and ethyl ortho γ-benzylmercapto-n-butyric ester.

The compounds of Formula VI can be readily converted to the corresponding 7-sulfamyl derivatives by chlorosulfonation (as with sulfonyl chloride and sodium chloride in an inert solvent) and then treatment of the resulting 7-chlorosulfonyl intermediate with ammonia.

The 4-YN(lower alkyl)-3-R"-6-R-7-R'''-3,4-dihydro-1,2,4-benzothiadiazine-1,1-dioxides of Formula I are prepared by an alternative process which comprises heating a 2-amino-4-R-benzenesulfonamide of the formula:

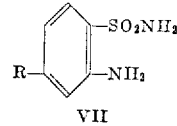

VII wherein R is as hereinbefore defined, with formic acid an ortho ester, i.e., R"C(O-lower alkyl) or an acid chloride, i.e., R"COCl reagent, thereby forming a 3-R"-6-R-benzothiadiazine-1,1-dioxide of the formula:

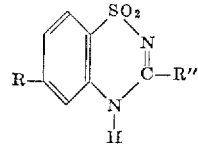

VIII wherein R and R" are as hereinbefore defined.

Among the suitable reagents may be mentioned: formic acid, lower alkanoic acid chlorides or lower alkyl orthoalkanoates, such as acetyl chloride, propionyl chloride, butyryl chloride, ethyl orthoacetate and ethylorthopropionate; aralkanoyl chlorides and lower alkyl ortho-aralkanoic acid esters particularly mononuclear aralkanoyl chlorides and lower alkyl ortho ar(lower alkanoic) esters, such as phenylacetyl chloride, ethyl orthophenylacetate, α-phenylpropionyl chloride, ethylorthopropionate, ethyl ortho-β-phenylpropionate, β-phenyl-n-butyryl chloride, o,m and p-tolyl-acetyl chloride, 6-phenyl-caproyl chloride and the o,m and p-halo- (e.g., chloro), nitro-, amino-, and lower alkoxy (e.g., methoxy) derivatives thereof, orthoaralkenoic esters and aralkenoyl chlorides, particularly mononuclear ar(lower alkenoyl) chlorides and alkyl ortho ar (lower alkenoic) esters such as cinnamyl chloride, β-phenyl-crotonyl chloride, ethyl ortho 2-phenyl-2-hexenoate and ethyl ortho 2-phenyl-4-hexenoate alkyl; lower alkyl ortho aroyl(lower alkanoates) and aroyl (lower alkanoyl) chlorides, particularly lower alkyl mononuclear ortho aroyl (lower alkanoic) esters and aroyl (lower alkanoyl) chlorides such as ethyl ortho phenyloxalate, β-benzoylpropionyl chloride and γ-benzoyl-valeroyl chloride; diaryl alkanoyl chlorides and ortho esters, particularly mononuclear diaryl(lower alkanoyl) chlorides and ortho esters, such as diphenylacetyl chloride, β,β-diphenylpropionyl chloride and ethyl ortho α,β-diphenyl propionate; ortho diaryl alkenoic esters and acid chlorides, particularly mononuclear lower alkyl ortho diaryl(lower alkenoic) esters and diaryl (lower alkenoyl) chlorides, such as ethyl ortho β,β-diphenyl crotonic ester; ortho aryloxyalkyl esters and aryloxyalkanoyl chlorides, particularly mononuclear aryloxy (lower alkanoyl) chlorides and ortho esters, such as phenoxyacetyl chloride, ethyl ortho β-phenoxypropionyl ester and ethyl ortho γ- (o, m or p-tolyoxy)-n-butyric ester; aralkoxy-alkanoyl chlorides and alkyl ortho aralkoxyalkanoates particularly mononuclear ethyl ortho aryl(lower alkoxy)-(lower alkanoates) and aryl (lower alkoxy)-lower alkanoyl chlorides, such as ethyl ortho phenethoxy acetate and ethyl ortho benzyloxyacetate; arylmercaptoalkanoyl chlorides and ortho arylmercaptoalkanoic esters, particularly mononuclear arylmercapto-(lower alkanoyl) chlorides and lower alkyl ortho arylmercapto (lower alkanoic) esters such as ethyl ortho phenylmercaptoacetate and β-phenyl-mercaptopropionyl chloride; and aralkylmercaptoalkanoyl chlorides and alkyl ortho-aralkylmercaptoalkanoic esters, particularly mononuclear ar(lower alkyl)mercapto lower alkanoyl chlorides and ethyl ortho-aryl-(lower alkyl)mercapto-lower alkanoates, such as ethyl ortho benzylmercaptoacetate, β-phenethylmercaptopropionyl chloride and ethyl ortho-γ-benzylmercapto-n-butyric ester.

Among the suitable benzene sulfonamide reagents, there may be named inter alia: 2-aminobenzenesulfonamide; 4-lower alkyl-2-aminobenzenesulfonamides, such as 4-methyl-2-aminobenzenesulfonamide, 4-ethyl-2-amino-benzenesulfonamide and 4-propyl-2-aminobenzenesulfonamide; 4-halo-2-aminobenzenesulfonamides, such as 4-chloro-2-aminobenzenesulfonamide and 4-fluoro-2-amino-benzenesulfonamide; 4 - haloalkyl-2-aminobenzenesulfonamides, particularly 4-halo(lower alkyl)-2-aminobenzene-sulfonamides, such as 4-trifluoromethyl-2-aminobenzene-sulfonamide, 4-dichloromethyl - 2 - aminobenzenesulfonamide and 4-β,β-dichloro-ethyl-2-aminobenzenesulfonamide; 4-alkoxy-2-amino-benzenesulfonamides particularly 4-(lower alkoxy)-2-aminobenzenesulfonamides, such as 4-methoxy-2-aminobenzenesulfonamide; 4-cyano-2-amino-benzenesulfonamide; 4-YN-sulfamyl-2-aminobenzenesulfonamides, wherein YN is as hereinbefore defined, such as N,N-dimethylsulfamyl-2-aminobenzenesulfonamide; 4-alkanesulfonyl-2-aminobenzenesulfonamides, particularly 4-(lower alkane)sulfonyl - 2-aminobenzenesulfonamides, such as 4-mesyl-2-aminobenzenesulfonamide; and 4-aralkanesulfonyl-2-aminobenzenesulfonamides.

The benzothiadiazine-1,1-dioxides of Formula VIII are next converted to the 4-YN(lower alkyl)-derivatives of the formula:

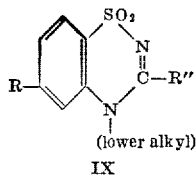

IX wherein R, R" and YN are as hereinbefore defined, as by treatment with sodamide and an aminoalkyl chloride of the formula YN-(lower alkyl)chloride. Among the suitable amino compounds there may be named: aminoalkyl chlorides (branched or straight chained), such as 2-chloro-ethylamine, 3-chloro-propylamine, and 6-chloro-hexylamine; N-substituted-amino-alkyl chlorides, such as N-methyl-2-chloro-ethylamine and N,N-diethyl-2-chloroethylamine; N-heterocyclic alkyl chlorides, such as piperidinoethyl chloride, 2-piperidinopropyl chloride, 3-piperidinopropyl chloride, 2-pyrrolidinoethyl chloride, 5-pyrrolidinohexyl chloride, piperazinomethyl chloride, 2-piperazinoethyl chloride, 3-piperazinopropyl chloride, 2-(4-methylpiperazino)ethyl chloride, 3-(4-ethylpiperazino)propyl chloride, 2-(4-hydroxyethylpiperazino)ethyl chloride, 2-(4-hydroxy-methoxypiperazino)ethyl chloride, and 3 - [4(β - hydroxyethoxyethylpiperazino)propyl chloride; and N-[monocyclic-ar(lower alkyl)] chloroalkylamines, such as N-benzyl-2-chloro ethylamine and N-phenethyl-3-chloro-propylamine.

Compounds of Formula IX are then reduced as by treatment with lithium aluminum hydride and aluminum chloride, to yield the 4-YN(lower alkyl)-3-R''-6-R-7-R'''-dihydrobenzothiadiazine-1,1-dioxides of the formula:

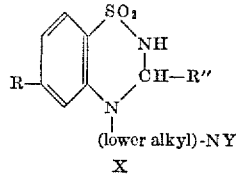

X wherein R, R" and YN are as hereinbefore defined.

The compounds of Formula X can be converted to their 7-sulfamyl analogs by chlorosulfonation (as by treatment with chlorosulfonic acid and sodium chloride in an inert solvent) and then treatment of the resulting 7-chloro sulfonyl intermediate with ammonia.

The compounds of this invention within the scope of Formula I are basic substances which react with molar amounts of acids to form salts. The salt forming reaction is conducted using conventional procedures. Suitable salt forming acids include non-toxic acids, such as mineral acids (e.g., hydrochloric, sulfuric, nitric and perchloric acid) and organic acids (e.g., pamoic, tartaric, maleic, acetic, enanthic and succinic acid).

The following examples are presented to more fully illustrate the present invention.

EXAMPLE 1

*2 - (3 - Dimethylaminopropyl) - 6 - Trifluoromethyl-1,2,4-Benzothiadiazine-1,1-Dioxide*

A. *Preparation of 2-nitro-4-trifluoromethyl-benzene-sulfonylchloride.*—A stirred suspension of 204 g. of crude 4,4' - bis(trifluoromethyl)-2,2'-dinitrodiphenyldisulfide in 900 ml. of 90% acetic acid is diffused with chlorine gas for a total of six hours. During the first four hours, the exothermic reaction is maintained at about 40° by regulating the input of chlorine; during the next two and one-half hours, the temperature is allowed to drop slowly. The mixture is then diffused with nitrogen for ten minutes, filtered off from about 20 g. of inorganic material, and the filtrate concentrated to dryness in vacuo. The residual semi-solid mass is extracted with 250 ml. of dry toluene, filtered from some insoluble material, and the filtrate concentrated in vacuo. The residue is again extracted with 250 ml. of dry toluene, the solution treated with Darco, filtered, and the filtrate concentrated in vacuo to give about 209 g. of crude sulfonyl chloride as an amber colored oil which crystallizes partially when stored in a cold room. This material is used in part B without further purification.

B. *Preparation of N-(3-dimethylaminopropyl)-2-nitro-4-(trifluoromethyl)benzenesulfonamide.*—To 48 g. of the crude sulfonyl chloride of part A in 500 ml. of dry acetonitrile, with stirring, is added dropwise 16.3 g. of 3-dimethylaminopropylamine in 200 cc. of dry acetonitrile. The mixture is then stirred and refluxed for one hour. The acetonitrile is distilled and the solid residue stirred with a solution of 8.4 g. of sodium bicarbonate in 200 ml. of water. The oil which separates, solidifies and is then filtered and air-dried to give 54 g. of solid which is extracted with 1600 ml. of boiling hexane (an orange gum remains) to give 37 g. of product, M.P. about 80–81°, which is recrystallized twice from hexane to give a product, M.P. about 82–83°.

C. *Preparation of N - (3 - dimethylaminopropyl)-2-amino-4-(trifluoromethyl)benzenesulfonamide.*—10 gms. of the nitro compound of part B in 200 ml. of 95% ethanol and 1 g. of 5% Pd on carbon is reduced under 50 p.s.i. of hydrogen. Reduction is rapid. The mixture is filtered and the filtrate concentrated on the steam bath. Darkening of the original pale yellow solution to orange occurs during this distillation. The residual orange oil crystallizes upon scratching and cooling. Extraction with ligroin gives 7 g. of the N-(3-dimethylaminopropyl)-2-amino - 4 - (trifluoromethyl) benzenesulfonamide which upon being recrystallized again from ligroin melts at about 91–92°.

D. *Preparation of 2-(dimethylaminopropyl)-6-trifluoromethyl-1,2,4-benzothiadiazine-1,1-dioxide.*—7 g. of the amino compound of part C and 70 ml. of triethyl orthoformate are placed in an oil bath preheated to about 120° and heated at this temperature for about 2.5 hours. The excess triethyl orthoformate is distilled, the residual solid is triturated with 50 ml. of 5% aqueous sodium hydroxide, the solid filtered, washed with water, dried, dissolved in 250 ml. of ligroine, the ligroine solution is decolorized with carbon, filtered, and the filtrate concentrated to give about 6.9 g. 2-(dimethylaminopropyl)-6-trifluoromethyl-1,2,4-benzothiadiazine-1,1-dioxide, M.P. about 53–55°.

EXAMPLE 2

*2 - (3 - Dimethylaminopropyl)-6-Trifluoromethyl-3,4-Dihydro-1,2,4-Benzothiadiazine-1,1-Dioxide*

A solution of 5.25 g. of N-(3-dimethylaminopropyl)-2-amino-4-(trifluoromethyl)benzenesulfonamide obtained in Example 1, part C, 1.3 g. of 37% aqueous formaldehyde, 10 ml. of 10% aqueous hydrochloric acid and 100 ml. of 95% ethanol is refluxed for three hours and concentrated to dryness. The residual solid is taken up in 100 ml. of water and neutralized by the addition of dilute aqueous ammonia. The precipitated solid is filtered and recrystallized from hexane to give about 2.2 g. of 2-(3-dimethylaminopropyl) - 6 - (trifluoromethyl)-3,4-dihydro-1,2,4-benzothiadiazine-1,1-dioxide, M.P. about 122–124°.

EXAMPLE 3

*2 - Aminoethyl - 6 - Trifluoromethyl-7-Sulfamyl-1,2,4-Benzothiadiazine-1,1-Dioxide*

A. *Preparation of N-(2-aminoethyl)-2-nitro-4-Trifluoromethylbenzenesulfonamide.*—To 28.9 g. of the sulfonyl chloride of Example 1(A) in 500 ml. of dry acetonitrile, with stirring, is added, dropwise, 19.0 g. of 2-phthalimidoethylamine in 50 ml. of acetonitrile. Treatment in accordance with the procedure of Example 1(B) yields a solid material which upon recrystallization is substantially pure N - (2-phthalimidoethyl)-2-nitro-4-trifluoromethyl - benzenesulfonamide. The phthalimido compound, 22.2 g., 6.7 ml. 85% hydrazine hydrate and 200 ml. of 95% ethanol are refluxed for two hours, a solution of 6.5 g. of 85% potassium hydroxide in 150 ml. 95% ethanol added, the mixture refluxed one hour, concentrated to dryness, and the residue dissolved in water. The aqueous solution is saturated with carbon dioxide and the precipitated solid filtered. Recrystallization from hexane gives N-(2-aminoethyl)-2-nitro-4-trifluoromethyl-benzenesulfonamide.

B. *Preparation to N-(2-aminoethyl)-2-amino-4-trifluoromethylbenzenesulfonamide.*—Following the procedure of Example 1(C), 10 g. of the product of Example 3(A) is reduced with 5% palladium on carbon under 50 p.s.i. of hydrogen to yield the product N-(2-aminoethyl)-2-amino-4-trifluoromethyl-benzenesulfonamide.

C. *Preparation of 2 - (aminoethyl)-6-trifluoromethyl-1,2,4-benzothiadiazine-1,1-dioxide.*—A solution of 7.1 g. of the product of Example 3 in 70 ml. of 98% formic acid is sealed in a carius tube and heated four hours at 140° and then concentrated to dryness to yield 2-(aminoethyl)-6-trifluoromethyl - 1,2,4 - benzothiadiazine-1,1-dioxide.

D. *Preparation of 2-(aminoethyl)-6-trifluoromethyl-7-sulfamyl-1,2,4-benzothiadiazine-1,1-dioxide.*—To 29.4 g. of the product of Example 3(C) in 100 ml. of tetrachloroethane is added 26 g. of 90% chlorosulfonic acid, dropwise. Subsequently, 11.8 g. of sodium chloride is added in small portions. When the evolution of gas subsides, the mixture is gradually raised to reflux temperature and the mixture refluxed for two hours when HCl evolution has ceased. The mixture is cooled and added rapidly to 100 ml. of concentrated aqueous ammonia with external ice cooling. Finally, the mixture is heated for two hours on the steam bath allowing the volatile material to escape. The solid which separates is filtered, washed well with water and recrystallized from 50% aqueous alcohol to give 2-(aminoethyl)-6-trifluoromethyl-7-sulfamyl-1,2,4-benzothiadiazine-1,1-dioxide.

EXAMPLE 4

*2-Aminoethyl-6-Trifluoromethyl-7-Sulfamyl-3,4-Dihydro-1,2,4-Benzothiadiazine-1,1-Dioxide*

Following the procedure of Example 2, 7.1 g. of the N-(2 - aminoethyl) - 2 - amino - 4 - trifluoromethyl-benzenesulfonamide, obtained in Example 3(B) is reacted with 2.1 g. of 37% aqueous formaldehyde in aqueous alcoholic hydrochloric acid to yield 2-amino-6-trifluoromethyl-3,4-dihydro-1,2,4-benzothiadiazine-1,1-dioxide.

The 2-aminoethyl-6-trifluoromethyl-3,4-dihydro-1,2,4-benzothiadiazine-1,1-dioxide is readily converted to its sulfamyl derivative by treatment with chlorosulfonic acid and sodium chloride in tetrachloroethane and by ammoniation, in accordance with the procedure of Example 3(D).

EXAMPLE 5

*2-(5-Diethylaminopentyl)-6-Chloro-3-Methyl-1,2,4-Benzothiadiazine-1,1-Dioxide*

A. *Preparation of 4 - chloro - 2 - nitrobenzenesulfonyl chloride.*—Following the procedure of Example 1(A) except for the use, as starting material, of 188.5 g. of 4,4'-dichloro-2,2'-(dinitro)-diphenyldisulfide, there is obtained 2-nitro-4-chloro-benzenesulfonylchloride.

B. *Preparation of N-(5-diethylaminopentyl)-2-nitro-4-chloro-benzenesulfonamide.*—Following the procedure of Example 1(B) except for the use, as starting material the sulfonyl chloride of part A and 5-diethylaminopentylamine in place of the 3-dimethylaminopropylamine, there is obtained as product N(5-diethylaminopentyl)-2-nitro-4-chlorobenzenesulfonamide.

C. *Preparation of N(5-diethylaminopentyl)-2-amino-4-chlorobenzenesulfonamide.*—Following the procedure of Example 1(C), except for the substitution of 6.5 g. of the sulfonamide of part B as starting material in the hydrogenation process, there is obtained N-(5-diethylaminopentyl)-2-amino-4-chlorobenzenesulfonamide.

D. *Preparation of 2-(5-diethylaminopentyl)-3-methyl-6-chloro-1,2,4-benzothiadiazine-1,1-dioxide.*—Twenty ml. of triethylorthoacetate are reacted with the product of part C (following the procedure outlined in Example 1(D)) to yield 2-(5-diethylaminopentyl)-3-methyl-6-chloro-1,2,4-benzothiadiazine-1,1-dioxide.

The product of part D is readily converted to its 7-sulfamyl derivative by treatment with chlorosulfonic acid and sodium chloride in tetrachloroethane and by ammoniation, in accordance with the procedure of Example 3(D).

EXAMPLE 6

*2-(5-Diethylaminopentyl)-6-Chloro-3-Methyl-3,4-Dihydro-1,2,4-Benzothiadiazine-1,1-Dioxide*

0.88 g. of acetaldehyde in 50 ml. of ethanol and 5 ml.

of 10% aqueous hydrochloric acid are reacted with 7.0 g. of the N-(5-diethylaminopentyl)-2-amino-4-chloro-benzenesulfonamide, obtained in Example 5(C), in a sealed carius tube to yield 2-(5-diethylaminopentyl)-3-methyl-6 - chloro - 3,4 - dihydro - 1,2,4 - benzothiadiazine - 1,1-dioxide.

The 2 - (5 - diethylaminopentyl) - 3 - methyl - 6 - chloro - 3,4 - dihydro - 1,2,4 - benzothiadiazine - 1,1 - dioxide is readily converted to its 7-sulfamyl derivative by treatment with chlorosulfonic acid and sodium chloride in tetrachloroethane and then ammoniation in accordance with the procedure of Example 3(D).

EXAMPLE 7

*2-(2-Piperidino-ethyl)-3-Benzyl-6-Cyano-1,2,4-Benzothiadiazine-1,1-Dioxide*

24.7 g. of 2-nitro-4-cyano benzenesulfonylchloride (prepared from 4,4'-(dicyano)-2,2'-(dinitro)-diphenyldisulfide according to the procedure of Example 1(A) are reacted with 12.8 g. of 2-piperidinoethylamine in accordance with the procedure of Example 1(B) to yield N-2-(piperidinoethyl) - 2 - nitro - 4 - cyanobenzenesulfonamide which latter is reduced in accordance with Example 1(C) to the corresponding N-(piperidinoethyl)-2-amino-4-cyanobenzenesulfonamide which is then reacted with triethyl orthophenylacetate to yield the product 2-(2-piperidinoethyl) - 3 - benzyl - 6 - cyano - 1,2,4 - benzothiadiazine-1,1-dioxide.

The corresponding 7-sulfamyl derivative is obtained by treatment with chlorosulfonic acid and sodium chloride in tetrachloroethane and then ammoniation in accordance with the procedure of Example 3(D).

EXAMPLE 8

*2-(2-Piperidinoethyl)-3-Benzyl-6-Cyano-3,4-Dihydro-1,2,4-Benzothiadiazine-1,1-Dioxide*

24.7 g. of 2-nitro-4-cyano benzenesulfonylchloride (prepared from 4,4'-(dicyano)-2,2'-(dinitro)-diphenyldisulfide according to the procedure of Example 1(A) are reacted with 12.8 g. of 2-piperidinoethylamine in accordance with the procedure of Example 1(B) to yield N-(2-piperidinoethyl) - 2 - nitro - 4 - cyanobenzenesulfonamide which latter is reduced as in accordance with Example 1(C) to the corresponding N-(piperidinoethyl)-2-amino-4-cyanobenzenesulfonamide which is then reacted with phenylacetaldehyde to yield the product 2-(2-piperidinoethyl) - 3 - benzyl - 6 - cyano - 3,4 - dihydro - 1,2,4-benzothiadiazine-1,1-dioxide.

The corresponding 7-sulfamyl derivative is obtained by treatment with chlorosulfonic acid and sodium chloride in tetrachloroethane and then ammoniation in accordance with the procedure of Example 3(D).

EXAMPLE 9

*2-[3-(4-Methylpiperazino)Propyl]-3(α-Methylbenzyl)-6-Methoxy-1,2,4-Benzothiadiazine-1,1-Dioxide*

25.2 g. of 4-methoxy-2-nitro benzenesulfonylchloride (prepared in accordance with the procedure of Example 1(A) from 4,4'-dimethoxy-2,2'-dinitro-diphenyldisulfide) are reacted with 15.7 g. of 3-(4-methylpiperazino)-propylamine to yield N-[3-(4-methylpiperazino)propyl]-2-nitro-4-methoxy-benzenesulfonamide which latter is hydrogenated in accordance with the procedure of Example 1(C) to yield the N-[3-(4-methylpiperazino)propyl]-2-amino - 4 - methoxybenzenesulfonamide. The latter is treated with triethylortho-(α-methylbenzylformate) in accordance with the procedure of Example 1(D) thereby yielding the product 2-[3-(4-methylpiperazine)propyl]-3(α - methylbenzyl) - 6 - methoxy - 1,2,4 - benzothiadiazine-1,1-dioxide.

The corresponding 7-sulfamyl derivative thereof is readily obtained by treatment with chlorosulfonic acid and sodium chloride in tetrachloroethane and then ammoniation in accordance with the procedure of Example 3(D).

EXAMPLE 10

*2-[3-(4-Methylpiperazino)Propyl]-3-(α - Methylbenzyl)-6-Methoxy-3,4-Dihydro - 1,2,4 - Benzothiadiazine-1,1-Dioxide*

25.2 g. of 4-methoxy-2-nitro benzenesulfonylchloride (prepared in accordance with the procedure of Example 1(A) from 4,4'-dimethoxy - 2,2' - dinitrophenyldisulfide) are reacted with 15.7 g. of 3-(4-methylpiperazino)-propylamine to yield N-[3-(4-methylpiperazino)propyl]-2-nitro-4-methoxy-benzenesulfonamide which latter is hydrogenated in accordance with the procedure of Example 1(C) to yield N-(3-(4-methylpiperazino)propyl - 2 - amino-4-methoxy-benzenesulfonamide. The latter is treated with 2-methyl-2-phenyl-acetaldehyde in accordance with the procedure of Example 2 thereby yielding the product 2-[3-(4-methylpiperazino) - propyl]-3(α-methyl-benzyl)-6-methoxy - 3,4 - dihydro - 1,2,4 - benzothiadiazine-1,1-dioxide.

The corresponding 7-sulfamyl derivative thereof is readily obtained by treatment with chlorosulfonic acid and sodium chloride in tetrachloroethane and then ammoniation in accordance with the procedure of Example 3(D).

EXAMPLE 11

*2 - [3 - (4 - Hydroxyethylpiperazino)Propyl]-3-Phenoxymethyl-6-Trifluoromethyl-1,2,4-Benzothiadiazine - 1,1-Dioxide*

Following the procedure of Example 1, parts B, C and D, there are respectively prepared N-[3-(4-hydroxyethylpiperazino)-propyl]-2-nitro - 4 - trifluoromethyl-benzenesulfonamide, 2 - amino-N-[3-(4-hydroxyethylpiperazino) propyl]-4-trifluoromethyl-benzenesulfonamide and the latter, treated with triethyl orthophenoxyacetate to give the product 2-[3-(4-hydroxyethylpiperazino)propyl] - 3 - phenoxymethyl-6-trifluoromethyl-1,2,4-benzothiadiazine - 1,1-dioxide. The corresponding 7-sulfamyl derivative is readily prepared by treatment of the latter with chlorosulfonic acid and sodium chloride in tetrachloroethane and then ammoniation in accordance with Example 3(D).

EXAMPLE 12

*2 - [3 - (4 - Hydroxyethylpiperazino)Propyl]-3-Phenoxymethyl-6-Trifluoromethyl 3,4-Dihydro-1,2,4-Benzothiadiazine-1,1-Dioxide*

Following the procedure of Example 1, parts B and C, there are respectively prepared N-[3-(4-hydroxyethylpiperazino)propyl]-2-nitro - 4 - trifluoromethyl-benzenesulfonamide, 2 - amino-N-[3-(4-hydroxyethylpiperazino) propyl] - 4 - trifluoromethyl-benzenesulfonamide and then following the procedure of Example 2, there is obtained the product 2-[3-(4-hydroxyethylpiperazino)propyl]-3-phenoxymethyl-6-trifluoromethyl - 3,4 - dihydro - 1,2,4-benzothiadiazine-1,1-dioxide. The corresponding 7-sulfamyl derivative is readily prepared by treatment of the latter with chlorosulfonic acid and sodium chloride in tetrachloroethane and then ammoniation in accordance with Example 3(D).

EXAMPLE 13

*2 - (3 - Pyrrolidinopropyl)-6-Methoxy-3-Phenylmercaptomethyl-3,4-1,2,4-Benzothiadiazine-1,1-Dioxide*

A. *Preparation of 4-methoxy-2-nitro benzenesulfonylchloride.*—Following the procedure of Example 1(A) except for the use of, as starting material, 41.6 g. of 4,4'-dimethoxy - 2,2' - dinitro, diphenyldisulffide, there is obtained 2-nitro-4-methoxybenzenesulfonylchloride.

B. *Preparation of N-pyrrolidinopropyl - 2 - nitro-4-methoxy--benzenesulfonamide.*—Following the procedure of Example 1(B) except for the use of, as starting material, 15.0 g. of the sulfonyl chloride and 6.2 g. of 3-(N-pyrrolidino)propylamine of part A, there is obtained as product, N-(pyrrolidinopropyl)-2-nitro - 4 - methoxy-benzenesulfonamide.

C. *Preparation of N-pyrrolidinopropyl-2-amino-4-methoxy-benzenesulfonamide.*—Following the hydrogenation procedure of Example 1(C) except for the use of 6.2 g. of the sulfonamide of part B as starting material, there is obtained N-pyrrolidinopropyl-2-amino-4-methoxy-benzenesulfonamide.

D. *Preparation of 2-pyrrolidinopropyl - 3 - phenylmercaptomethyl-6-methoxy-1,2,4 - benzothiadiazine-1,1-dioxide.*—Sodium thiophenylate and chloroacetonitrile are reacted in refluxing ethanol to give phenylmercaptoacetonitrile. The phenylmercaptoacetonitrile in absolute ethanol is treated with dry hydrogen chloride at 0° until the mixture is saturated, then set aside in the cold for two days. Addition of five volumes of anhydrous ether precipitates the imido ester hydrochloride, which is filtered, redissolved in absolute ethanol and the solution refluxed to give triethyl orthophenylmercaptoacetate.

5.4 g. of triethyl orthophenylmercaptoacetate are reacted with the product of part C, following the procedure of Example 1(D), to yield 2-pyrrolidinopropyl-3-phenylmercaptomethyl-6-methoxy - 1,2,4 - benzothiadiazine-1,1-dioxide.

The product of part D is readily converted to its 7-sulfamyl derivative by treatment with sulfonyl chloride and sodium chloride in ethylene dichloride, and then ammoniation in accordance with the procedure of Example 3(D).

EXAMPLE 14

*2-(3-Pyrrolidinopropyl)-6-Methoxy - 3 - Phenylmercaptomethyl-3,4-Dihydro-1,2,4-Benzothiadiazine-1,1-Dioxide*

15.2 g. of phenylmercaptoacetaldehyde are reacted with 30.9 g. of the N-pyrrolidinopropyl-2-amino-4-methoxy-benzeneslfonamide, obtained in Example 13, part C, following the procedure of Example 2, to yield 2-pyrrolidinopropyl-3-phenylmercaptomethyl - 6 - methoxy-3,4-dihydro-1,2,4-benzothiadiazine-1,1-dioxide.

The product of Example 14 is readily converted to its 7-sulfamyl derivative by treatment with chlorosulfonic acid and sodium chloride in ethylene dichloride, and then ammoniation in accordance with the procedure of Example 3(D).

EXAMPLE 15

*4-Aminoethyl-6-Trifluoromethyl-1,2,4-Benzothiadiazine-1,1-Dioxide*

A. *Preparation of 6-trifluoromethyl - 1,2,4 - benzothiadiazine-1,1-dioxide.*—2-nitro - 4 - trifluoromethylbenzenesulfonyl chloride prepared as in Example 1(A) is reacted with concentrated aqueous ammonia to give 2-nitro-4-trifluoromethylbenzenesulfonamide, M.P. 161–163° after recrystallization from 50% aqueous ispropanol. Reduction of the nitro compound in ethanol, using 5% palladium on carbon under 50 p.s.i. of hydrogen and at 50° give 2-amino-4-trifluoromethylbenzenesulfonamide, M.P. 148–149°. The amino compound and four volumes of 98–100% formic acid are refluxed for two hours and the solution concentrated to dryness to give 6-trifluoromethyl-1,2,4-benzothiadiazine-1,1-dioxide, M.P. 253–255° after recrystallization from water.

B. *Preparation of 4 - aminoethyl - 6 - trifluoromethyl-1,2,4-benzothiadiazine-1,1-dioxide.*—A mixture of 23.5 g. of the product from 4.7 g. of sodium amide and 200 ml. of dry dimethyl ether of diethylene glycol are stirred for one hour at room temperature and then 30.4 g. of 2-phalimidoethyl bromide in 50 ml. of the same solvent is added, dropwise. The mixture is stirred and heated at 110° for 24 hours, filtered, and the filtrate concentrated to dryness. The residue is dissolved in 500 ml. of 95% ethanol, 6.7 ml. of 85% hydrazine hydrate added and the solution is refluxed for four hours, cooled, 6.7 g. of 85% potassium hydroxide is added, refluxing continued for one hour, and the solution concentrated to dryness. The residue is dissolved in water and the solution is saturated with carbon dioxide. The oil which separates is extracted with chloroform, the chloroform extracts are dried and concentrated to give 4-aminoethyl-6-trifluoromethyl - 1,2,4 - benzothiadiazine-1,1-dioxide.

EXAMPLE 16

*4-Aminoethyl-6-Trifluoromethyl-3,4-Dihydro-1,2,4-Benzothiadiazine-1,1-Dioxide*

The 4-aminoethyl - 6 - trifluoromethyl-1,2,4-benzothiadiazine-1,1-dioxide, obtained in Example 15, part B, is reduced by means of a mixture of lithium aluminum hydride and aluminum chloride (1:1 molar ratio) to give 4 - aminoethyl - 6 - trifluoromethyl - 3,4 - dihydro-1,2,4-benzothiadiazine-1,1-dioxide.

EXAMPLE 17

*4[5-(N,N-Diethylamino)Pentyl]-3-Methyl-6-Chloro-1,2,4-Benzothiadiazine-1,1-Dioxide*

Reaction of 20.6 g. of 4-chloro-2-aminobenzenesulfonamide with 40 ml. of triethyl orthoacetate in accordance with the procedure outlined in Example 15(A) yields 6-chloro-3-methyl-1,2,4-benzothiadiazine-1,1-dioxide. Reaction of 21.4 g. of the latter with 21.3 g. of N,N-diethyl-1-aminopentyl chloride and 4.7 g. of sodamide in accordance with the procedure of Example 15(B) yields the product 3 - methyl - 4[N,N-diethylaminopentyl]-6-chloro-1,2,4-benzothiadiazine-1,1-dioxide.

The corresponding 7-sulfamyl derivative is readily prepared in accordance with the procedure of Example 3(D) by chlorosulfonation, and then ammoniation of the thus obtained 7-sulfonylchloride derivative.

EXAMPLE 18

*4-[5-(N,N-Diethylamino)Pentyl]-3-Methyl-6-Chloro-3,4-Dihydro-1,2,4-Benzothiadiazine-1,1-Dioxide*

The 3-methyl-4-(N,N - diethylaminopentyl)-6-chloro-1,2,4-benzothiadiazine-1,1-dioxide, obtained in Example 17, is reduced with lithium aluminum hydride and aluminum chloride to yield the desired product 3-methyl-4-[5-(N,N-diethylamino)-pentyl] - 6 - chloro-3,4-dihydro-1,2,4-benzothiadiazine-1,1-dioxide The corresponding 7-sulfamyl derivative is readily prepared in accordance with the procedure of Example 3(D) by chlorosulfonation, and then ammoniation of the thus obtained 7-sulfonylchloride derivative.

EXAMPLE 19

*4-[2-(Piperidino)Ethyl]-3-Benzyl-6-Methoxy-1,2,4-Benzothiadiazine-1,1-Dioxide*

Reaction of 21.3 g. of 4-methoxy-2-amino benzenesulfonamide with 5.0 g. of triethyl orthophenylacetate in accordance with the procedure outlined in Example 15(A) yields 6 - methoxy-3-benzyl-1,2,4-benzothiadiazine-1,1-dioxide. Reaction of 6.04 g. of the latter with 3.3 g. of 2-piperadinoethyl-chloride and 1.0 g. of sodamide in accordance with the procedure of Example 15(B) yields the product 3-benzyl-4-[2-piperidinoethyl]-6-methoxy-1,2,4-benzothiadiazine-1,1-dioxide.

The corresponding 7-sulfamyl derivative is readily prepared in accordance with the procedure of Example 3(D) by chloro sulfonation and then ammoniation of the thus obtained 7-sulfonyl chloride derivative.

EXAMPLE 20

*4-[2-(Piperidino)Ethyl]-3-Benzyl-6-Methoxy-3,4-Dihydro-1,2,4-Benzothiadiazine-1,1-Dioxide*

The 3 - benzyl-4-[2-piperidinoethyl]-6-methoxy-1,2,4-benzothiadiazine-1,1-dioxide, obtained in Example 19, is reduced with lithium aluminum hydride and aluminum chloride to yield the product 3-benzyl-4-[2-piperidinoethyl] - 6 - methoxy-3,4-dihydro-1,2,4-benzothiadiazine-1,1-dioxide.

The corresponding 7-sulfamyl derivative is readily prepared in accordance with the procedure of Example 3(D) by chloro sulfonation and then ammoniation of the thus obtained 7-sulfonyl chloride derivative.

EXAMPLE 21

*4-[3-(4-Methylpiperazino)Propyl]-3-Benzylmercapto-6-Mesyl-1,2,4-Benzothiadiazine-1,1-Dioxide*

Reaction of 25.0 g. of 4-mesyl-2-amino benzenesulfonamide with 60 g. of triethyl orthobenzylmercaptopropionate prepared by reacting the adduct of benzylmercaptan to acrylonitrile, i.e., benzylmercaptopropionitrile, with ethanolic hydrogen chloride at 7° C. to yield the imido ester hydrochloride which is converted to triethyl orthobenzylmercaptopropionate in accordance with the procedure outlined in Example 15(A) yields 6-mesyl-3-benzylmercaptoethyl - 1,2,4-benzothiadiazine-1,1-dioxide. Reaction of 10 g. of the latter with 9.7 g. of N'-methyl-piperazinopropylchloride 2.2 g. of sodamide in accordance with the procedure of Example 15(B) yields the product 3-benzylmercaptoethyl - 4 - [3 - (4 - methylpiperazino)propyl] - 6 - mesyl - 1,2,4 - benzothiadiazine-1,1-dioxide.

The corresponding 7-sulfamyl derivative is readily prepared in accordance with the procedure of Example 3(D) by the chlorosulfonation thereof and then ammoniation of the thus obtained 7-sulfonylchloride derivative.

EXAMPLE 22

*4-[3-(4-Methylpiperazino)Propyl] - 3 - Benzylmercaptoethyl - 6 - Mesyl-3,4-Dihydro-1,2,4-Benzothiadiazine-1,1-Dioxide*

The 3 - benzylmercaptoethyl - 4 - [3-(4-methylpiperazino)propyl] - 6 - mesyl - 1,2,4 - benzothiadiazine - 1,1-dioxide obtained in Example 21 is reduced with lithium aluminum hydride and aluminum chloride to yield the desired product, 3-benzylmercaptoethyl-4-[3-(4-methylpiperazino)propyl] - 6 - mesyl - 3,4 - dihydro - 1,2,4-benzothiadiazine-1,1-dioxide.

The corresponding 7-sulfamyl derivative is readily prepared in accordance with the procedure of Example 3(D) by the chlorosulfonation thereof and then ammoniation of the thus obtained 7-sulfonylchloride derivative.

EXAMPLE 23

*6-Phenoxymethyl - 3 - Dichloromethyl-4-[3-(4-Hydroxyethylpiperazinol) - Propyl] - 1,2,4 - Benzothiadiazine-1,1-Dioxide*

A mixture of 26.4 g. of 4-phenoxy-2-aminobenzenesulfonamide and 24 g. of dichloroacetic anhydride are heated for about three hours in an oil bath at 150°; the temperature is then raised to 225° and kept there for one hour to give 6-phenoxymethyl-3-dichloromethyl-1,2,4-benzothiadiazine-1,1-dioxide. Reaction of 3.58 g. of the latter with 2.5 g. of 3-(4-hydroxyethylpiperazino)propylchloride (prepared by the reaction of piperazinoethanol with trimethylene chlorobromide in an inert solvent), and 0.47 g. of sodamide in accordance with the procedure of Example 15(B) yields the product 3-dichloromethyl-4 - [3 - (4-hydroxyethylpiperazino)propyl]-6-phenoxymethyl-1,2,4-benzothiadiazine-1,1-dioxide.

The corresponding 7-sulfamyl derivative is readily prepared in accordance with the procedure of Example 3(D) by chlorosulfonylation, and then ammoniation of the thus obtained 7-sulfonylchloride derivative.

EXAMPLE 24

*6-Phenoxymethyl-3-Dichloromethyl - 4 - [3-(4'-Hydroxyethylpiperazino)-Propyl] - 3,4 - Dihydro - 1,2,4 - Benzothiadiazine-1,1-Dioxide*

The 3-dichloromethyl-4-[3-(4-hydroxyethylpiperazino)-propyl]-6 - phenoxymethyl - 1,2,4 - benzothiadiazine - 1,1-dioxide, obtained in Example 23, is reduced with lithium aluminum hydride and aluminum chloride to yield the desired product, 3-dichloromethyl-4-[3-(4'-hydroxyethylpiperazino)propyl]-6-phenoxymethyl-3,4 - dihydro - 1,2,4-benzothiadiazine-1,1-dioxide.

The corresponding 7-sulfamyl derivative is readily prepared in accordance with the procedure of Example 3(D) by chlorosulfonation, and then ammoniation of the thus obtained 7-sulfonylchloride derivative.

EXAMPLE 25

*2[3-(Dimethylamino)Propyl] - 6 - Trifluoromethyl - 3,4-Dihydro-1,2,4-Benzothiadiazine - 1,1 - Dioxide Maleic Acid Salt*

6.7 g. of 2 - [3 - (dimethylamino)propyl] - 6 - trifluoromethyl-3,4-dihydro-1,2,4-benzothiadiazine - 1,1 - dioxide, maleic acid salt is dissolved in 40 ml. of isopropanol and the solution treated with 2.5 g. of maleic acid. The mixture is heated to the boiling point and cooled to give the maleic acid salt.

Similarly, treating the 2(3-dimethylaminopropyl)-6-trifluoromethyl-1,2,4-benzothiadiazine-1,1-dioxide, according to the procedure of Example 25, gives the maleic acid salt.

EXAMPLE 26

*4-[5-(N,N-Diethylamino)Pentyl] - 3 - Fluoro - 1,2,4-Benzothiadiazine-1,1-Dioxide, Hydrochloride*

The base, as obtained in Example 18, is dissolved in ten volumes of anhydrous ethyl ether and the cooled solution treated with one equivalent of hydrogen chloride in ether. The hydrochloride is precipitated, filtered, and recrystallized from isopropanol to give the pure hydrochloride.

EXAMPLE 27

*4-[5-(N,N-Diethylamino)Pentyl] - 3 - Methyl - 6 - Fluoro-3,4 - Dihydro - 1,2,4 - Benzothiadiazine - 1,1 - Dioxide Hydrochloride*

7.2 g. of 4-[5-(N,N-diethylamino)pentyl]-3-methyl-6-fluoro-3,4-dihydro-1,2,4-benzothiadiazine - 1,1 - dioxide is dissolved in ten volumes of anhydrous ethyl ether and the cooled solution treated with one equivalent of hydrogen chloride in ether. The hydrochloride is precipitated, filtered and recrystallized from isopropanol to give the pure hydrochloride.

This invention may be variously otherwise embodied within the scope of the appended claims.

What is claimed is:

1. A compound selected from the group consisting of bases of the formula

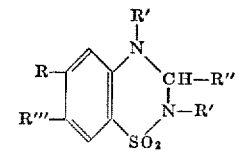

wherein R is a member selected from the group consisting of hydrogen, lower alkyl, halo, halo(lower alkyl), lower alkoxy, lower alkyl sulfonyl, monocyclic carbocyclic aryl (lower alkyl)-sulfonyl and cyano; one R' is hydrogen and the other R' is a member of the group consisting of amino (lower alkyl), lower alkylamino(lower alkyl), di(lower alkyl)-amino(lower alkyl), phenyl(lower alkyl)amino- (lower alkyl), piperidino(lower alkyl), pyrrolidino(lower alkyl), piperazino(lower alkyl), 4-(hydroxy-lower alkyl)-piperazino(lower alkyl); R" is a member of the group consisting of hydrogen, lower alkyl, halo(lower alkyl), phenyl(lower alkyl), phenylmercapto(lower alkyl), phenoxy(lower alkyl) and phenyl(lower alkyl)mercapto- (lower alkyl); and R''' is a member of the group consisting of hydrogen and sulfamyl; and non-toxic acid addition salts of said bases.

2. 4-di[lower alkylamino(lower alkyl)]-6-halo(lower alkyl)-3,4-dihydro-1,2,4-benzothiadiazine 1,1-dioxide.

3. 4-di[lower alkylamino(lower alkyl)]-6-halo-3,4-dihydro-1,2,4-benzothiadiazine 1,1-dioxide.

4. 4-piperazino(lower alkyl)-3-phenyl(lower alkyl)-6-halo-3,4-dihydro-1,2,4-benzothidiazine 1,1-dioxide.

5. 2-amino(lower alkyl) - 6 - halo(lower alkyl)-7-sulfamyl-3,4-dihydro-1,2,4-benzothiadiazine 1,1-dioxide.

6. 2-(3-dimethylaminopropyl) - 6 - trifluoromethyl-3,4-dihydro-1,2,4-benzothiadiazine 1,1-dioxide.

7. 2-di[lower alkylamino(lower alkyl)]-6-halo(lower alkyl)-3,4-dihydro-1,2,4-benzothiadiazine 1,1-dioxide.

8. A compound selected from the group consisting of bases of the formula

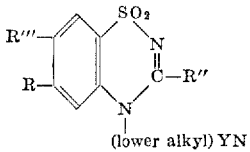

and

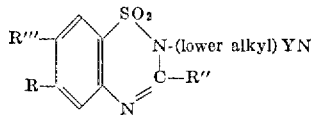

wherein R''' is a member selected from the group consisting of hydrogen and sulfamyl; R is a member selected from the group consisting of hydrogen, lower alkyl, halo, halo(lower alkyl), lower alkoxy, lower alkyl sulfonyl, monocyclic carbocyclic aryl(lower alkyl)sulfonyl and cyano; YN is a member selected from the group consisting of amino, lower alkyl amino, di(lower alkyl)amino, phenyl(lower alkyl)amino, piperidino, pyrrolidino, piperazino, 4-(lower alkyl)piperazino and 4-(hydroxy-lower alkyl)piperazino; and R'' is a member selected from the group consisting of hydrogen, lower alkyl, halo(lower alkyl), phenyl(lower alkyl), phenylmercapto(lower alkyl), phenoxy(lower alkyl) and phenyl(lower alkyl)mercapto(lower alkyl); and non-toxic acid addition salts of said bases.

9. 4-di[lower alkylamino(lower alkyl)]-6-halo-1,2,4-benzothiadiazine 1,1-dioxide.

10. 2-piperazino(lower alkyl)-3-(lower alkyl)-6-halolower alkyl-1,2,4-benzothiadiazine 1,1-dioxide.

11. 4-amino(lower alkyl)-6-halo(lower alkyl)-1,2,4-benzothiadiazine 1,1-dioxide.

12. 4 - (3 - dimethylaminopropyl) - 6 - trifluoromethyl-1,2,4-benzothiadiazine 1,1-dioxide.

13. 2-di[lower alkylamino(lower alkyl)]-6-halo(lower alkyl)-1,2,4-benzothiadiazine 1,1-dioxide.

14. 2-di[lower alkylamino(lower alkyl)]-6-halo(lower alkyl)-7-sulfamyl-1,2,4-benzothiadiazine 1,1-dioxide.

No references cited.

UNITED STATES PATENT OFFICE
CERTIFICATE OF CORRECTION

Patent No. 3,090,783                           May 21, 1963

Harry L. Yale

It is hereby certified that error appears in the above numbered patent requiring correction and that the said Letters Patent should read as corrected below.

Column 2, lines 61 to 65, the formula should appear as shown below instead of as in the patent:

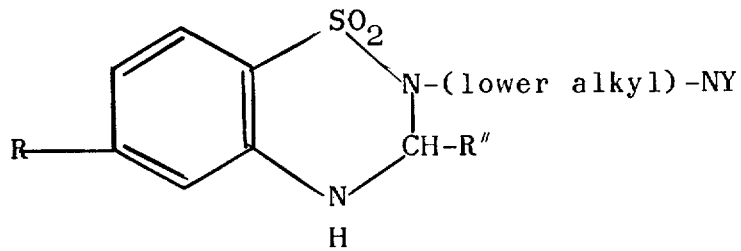

column 7, line 1, for "80-81°" read -- 80-82° --; column 10, line 70, for "diphenyldisulffide" read -- diphenyldisulfide --; column 11, line 37, for benzeneslfonamide" read -- benzenesulfonamide --.

Signed and sealed this 3rd day of December 1963.

(SEAL)
Attest:
ERNEST W. SWIDER

Attesting Officer

EDWIN L. REYNOLDS
                                      Acting Commissioner of
                                                Patents